Figure 1:
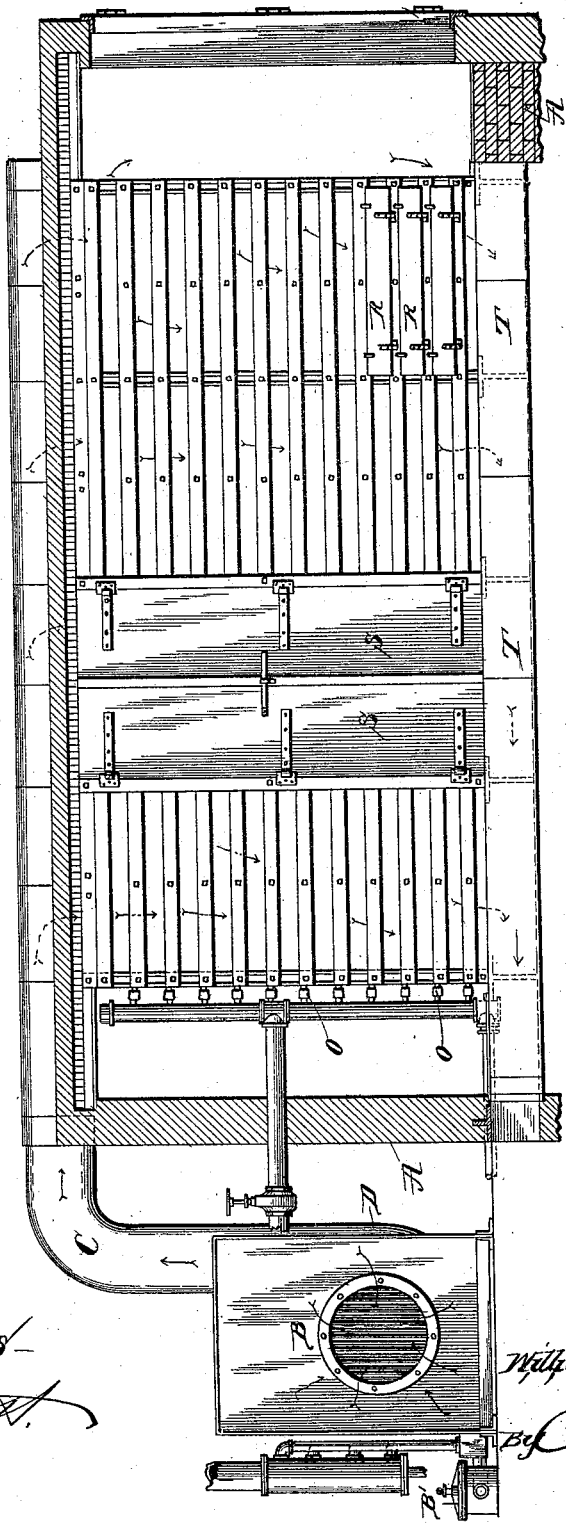

(No Model.) 4 Sheets—Sheet 1.

W. F. JOBBINS.
DRIER.

No. 534,561. Patented Feb. 19, 1895.

Witnesses
Inventor
William F. Jobbins (No Model.) 4 Sheets—Sheet 2.
W. F. JOBBINS.
DRIER.
No. 534,561. Patented Feb. 19, 1895.
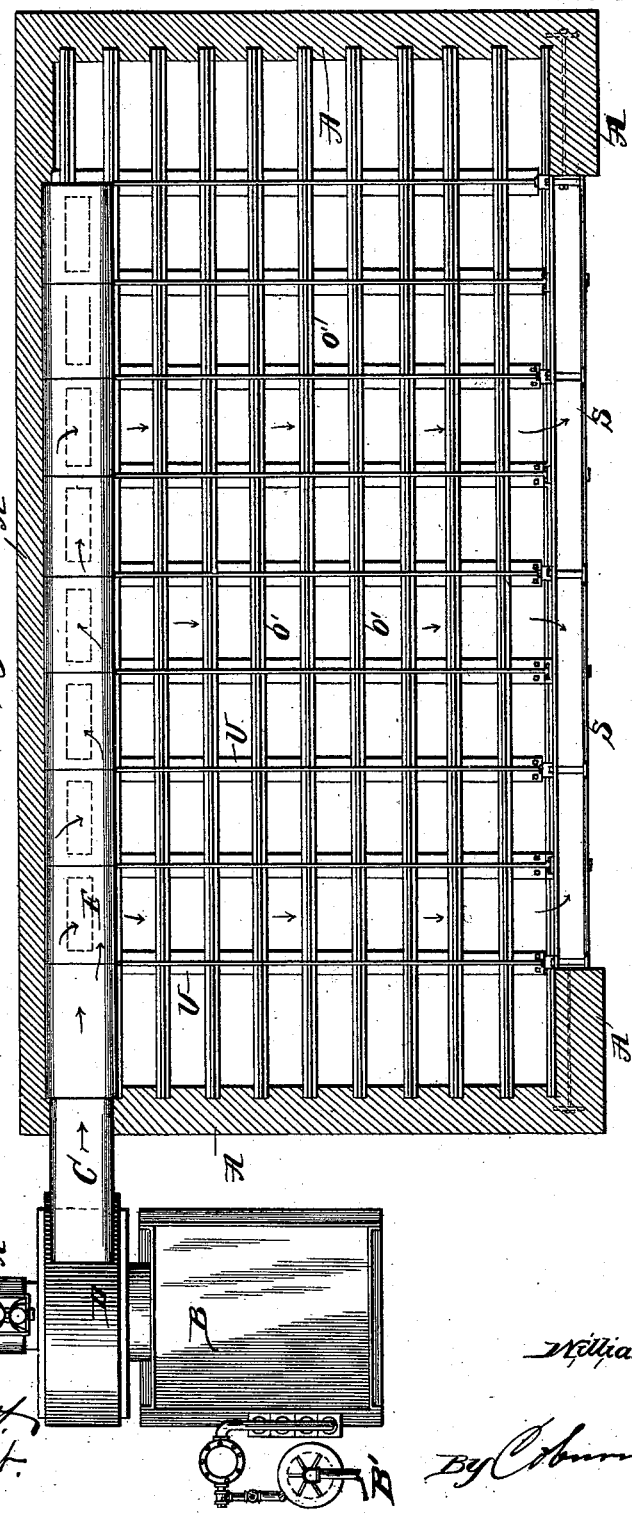
Witnesses
Inventor
William F. Jobbins
By
Atty's (No Model.) 4 Sheets—Sheet 3.
W. F. JOBBINS.
DRIER.
No. 534,561. Patented Feb. 19, 1895.
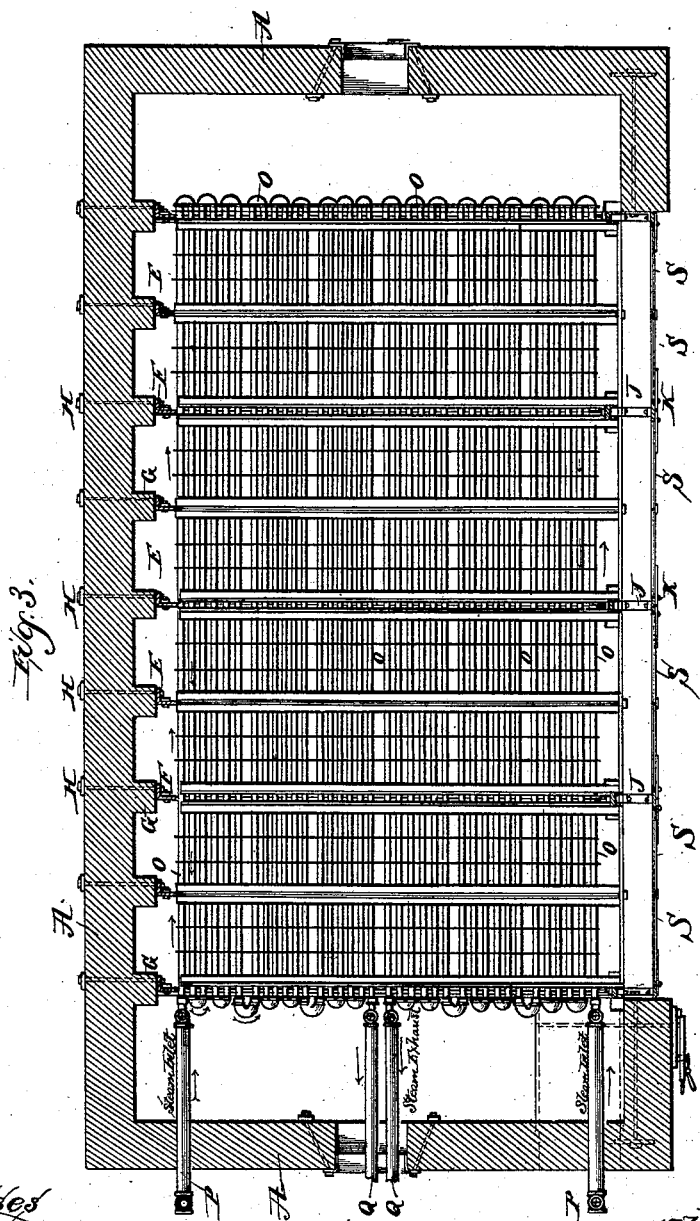

(No Model.) 4 Sheets—Sheet 4.
W. F. JOBBINS.
DRIER.
No. 534,561. Patented Feb. 19, 1895.
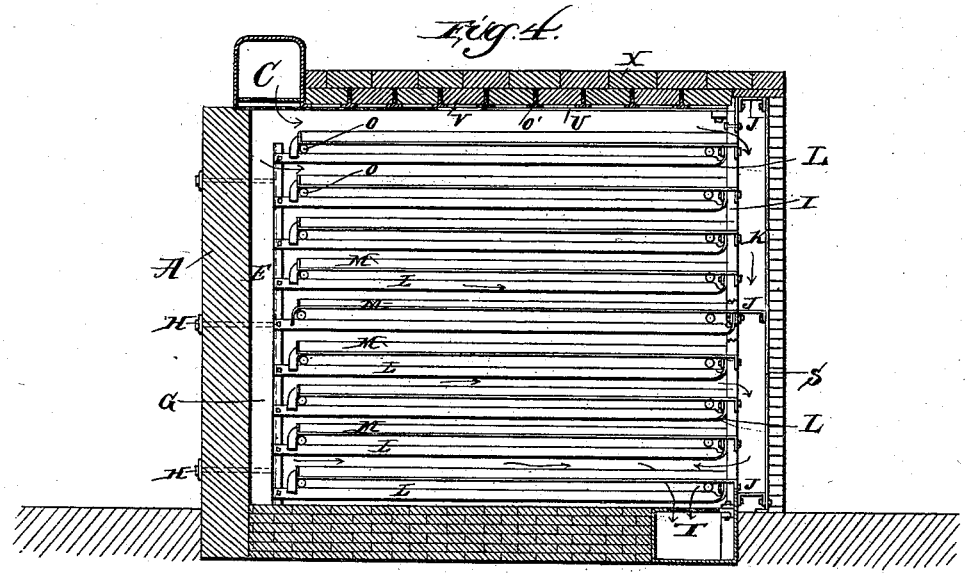
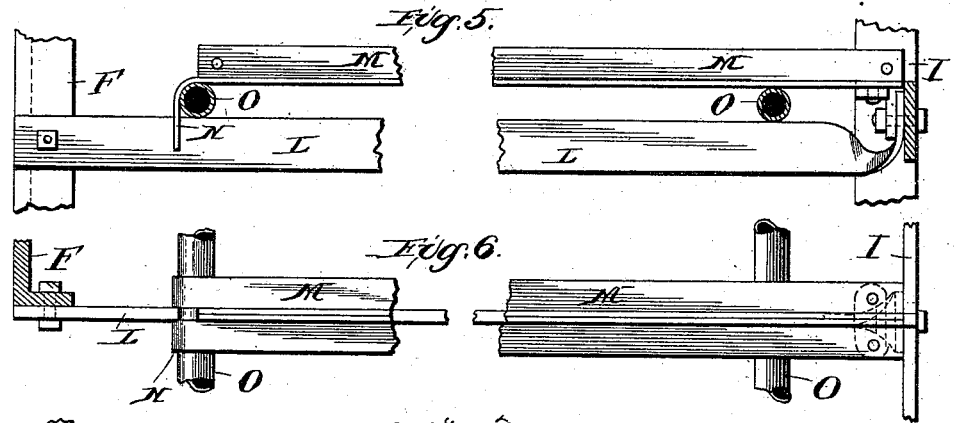
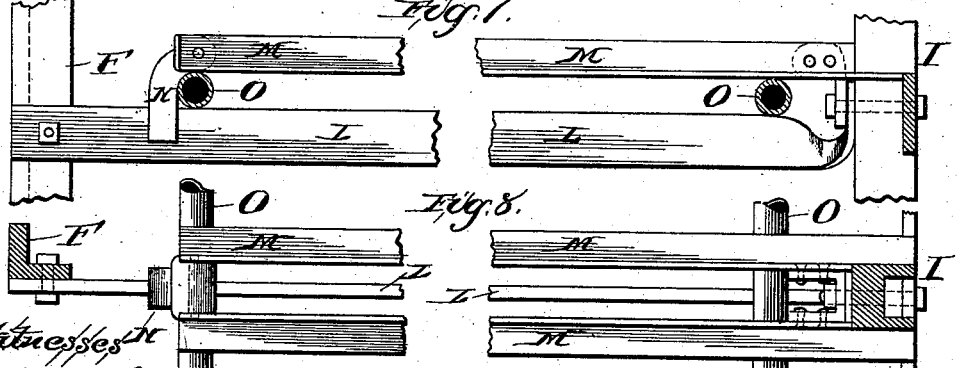

UNITED STATES PATENT OFFICE.

WILLIAM F. JOBBINS, OF CHICAGO, ILLINOIS, ASSIGNOR OF ONE-HALF TO JOSEPH VAN RUYMBEKE, OF SAME PLACE.

DRIER.

SPECIFICATION forming part of Letters Patent No. 534,561, dated February 19, 1895.

Application filed November 7, 1889. Serial No. 329,509. (No model.)

*To all whom it may concern:*

Be it known that I, WILLIAM F. JOBBINS, a citizen of the United States, residing at Chicago, in the county of Cook and State of Illinois, have invented a certain new and useful Improvement in Driers, which is fully set forth in the following specification, reference being had to the accompanying drawings, in which—

Figure 1 is a front elevation with a portion of the front wall removed; Fig. 2, a plan view; Fig. 3, a longitudinal section, taken between two series of pans; Fig. 4, a cross section of a detached portion showing supports for the steam pipes and an angle iron which supports the pans. Figs. 5, 6, 7 and 8 are detached views of the devices which support the steam pipes and the pans.

My invention relates to that class of driers intended to evaporate liquids rapidly.

My invention consists in heating the liquid in the pans in which the evaporation is made and at the same time forcing over the surface of said pans large volumes of heated air to carry away the vapor which arises from the liquid as it is heated and thus oxidize the product.

My invention further consists in the construction of the drier hereinafter fully described, whereby I am enabled to have a large number of shallow pans held in the smallest space possible and at the same time have steam pipes arranged between each layer or set of pans with an air space above each layer or set of pans with suitable connections for passing live steam through the steam pipes and forcing a volume of hot air through the spaces above each layer or set of pans.

In the accompanying drawings, A represents the outer wall in which my battery drier is placed.

B is a heater preferably composed of a coil of steam pipes among which air is drawn by a suitable fan and forced through the pipe, C, to the spaces between the pans.

D is the blower or fan which draws the air through the heater B and forces it through the pipe C. Throughout the entire length of the apparatus the air passes from the pipe C down the flues, E, behind the pans which contain the liquid to be dried. From these flues E there is an opening above each pan through which the hot air passes in contact with the liquid in the pans.

F, F, are angle irons bolted to the interior projections, G, of the rear wall A, by bolts, H, as clearly shown in Figs. 3 and 4.

Near the front of the apparatus are uprights, I, bolted at the top and bottom and at intermediate points if desirable to heavy channel irons J, which channel irons are secured to the main walls of the device. In Fig. 4, I illustrate three of these channel irons for supporting the uprights I.

L are iron supports bolted at their rear ends to the angle iron F and at their front ends to the uprights I. Said supports L are spaced vertically to give room for the steam pipes, for the angle irons M which support the pans, and for the pans. The apparatus can be made of any desired height, but I ordinarily would use from eight to twelve series of these supporting irons L, one above the other, and as many on the same horizontal plane as I may desire to continue the length of the apparatus.

M are angle irons on which the pans rest, the front end of these angle irons being secured to the front uprights I, or to crosspieces between said uprights, while the rear ends rest on the supporting pieces L by means of a forked piece N. The forked end of said piece N straddles the supporting piece L, while the other end is firmly secured to the angle iron M.

The notched pieces are bolted to one end of the angle iron M, as shown in Fig. 7, and rest on the supporting iron L. The notch in the piece N is wide enough to receive the supporting iron L, by which construction the notched iron N supports one end of the angle iron M, and prevents it from turning laterally without being bolted or otherwise fastened to the iron L. Ordinarily the angle irons M, are supported at their free ends by the live steam pipes to be presently referred to, in which case the forked pieces N serve principally to hold said angle irons in their proper positions parallel with the supports L, but said forked pieces N may be used to support the free ends of said angle irons M, as will be evident. This construction of the attachments by which the angle irons M are held in place facilitates their ready removal from the front of the battery when desired.

O are the steam pipes which carry live steam beneath all of the pans in the battery. These steam pipes which are preferably in continuous lengths or coils rest upon the supporting bars L directly beneath the pans which are supported upon the angle irons M.

P, P, are the pipes which admit live steam to the steam pipes O, each layer of said steam pipes having an inlet pipe connected with the upright pipe at the end of the battery, as well as a steam outlet or exhaust pipe, Q. I preferably place two layers of these steam pipes on each floor of the battery, admitting the live steam at the front and rear of the battery, and taking the exhaust steam from the middle of the battery as shown in Fig. 3.

At the front of the battery I have hinged doors, S, through which the pans containing the liquid to be dried are placed upon their supporting angle irons M. These doors S, S, occupy practically the entire front of the device, as shown in Fig. 3, and are hinged to swing outward, the vertical hinges of the same being preferably in line with the supports L and M, or with alternate supports, so as not to interfere with the introduction of the pans. I preferably place two pans side by side through each door, the pans extending from the front to the rear of the battery.

The front frame K of the battery in which the doors, S, are hung is sufficiently far from the front of the pans, to enable the smaller doors R to open. These doors R, which are hinged horizontally, are mounted in front of each series of pans, and prevent the heated air from circulating outside of the pans, there being sufficient space between the front ends of the pans and said doors, to allow the hot air to pass down to the exit opening to be presently described. The air which is forced over the pans passes down between the front end of the pans and the doors R into the opening, T, which extends the entire length of the front of the battery and serves as an exit for the hot air blast after it is passed over the liquid in the pans.

The construction of the roof of the battery is clearly shown in Figs. 4 and 2. T-irons, U, are placed from wall to wall of the battery between which are placed short irons, O'. A layer of tile, V, is supported by these irons and a second tier of tile, X, is laid on the tile V, breaking the joints with the first tier. By laying these tiles in cement, I have a practically tight cover for the battery, and and at the same time one that can be removed in parts or repaired in parts without disturbing the entire roof. At each end of the battery pans I leave spaces for repairing the steam pipe when necessary.

I have shown in the drawings at A' an engine for driving the blower D, and at B' a steam trap, neither of which forms any part of my invention.

In Fig. 6 the two angle irons M are placed close side by side, directly over the supporting piece L, while in Fig. 8 they are spread from each other, by reason of the construction of the front standard iron intervening between them.

The operation of my battery drier is as follows:—The battery is first filled with pans filled with liquid to be dried. Steam is admitted through the steam pipes P into the pipes O and the contents of the pans heated. At the same time the hot air is blown through the large pipe C, passing down the flues E, from which it is distributed over the surface of each pan, from rear to the front of the battery and down into the conduit T, from which it passes to any desired place of escape. As the contents of the pans are sufficiently dried they are readily removed and replaced by opening the doors R, which are reached through the doors S. I find that by applying heat to the contents of the pans and at the same time forcing a blast of hot air over the pans throughout the battery, I am able to evaporate any material in the pans very rapidly, while my entire battery is easily constructed, repaired with facility, and is exceedingly compact, thus utilizing the space, which in many instances is very essential.

Having thus fully described my invention, what I claim, and desire to secure by Letters Patent, is—

1. In a drier, the combination with the drying chamber, the back wall thereof being provided with vertical projections G, forming parallel flues E, of the angle irons F secured to said projections G, the vertical supports I, mounted within the drying chamber near the front wall thereof, the supporting irons L, bolted to the supports I and angle irons F, said supporting irons L being horizontally arranged one above the other, the steam pipes O mounted on said supporting irons L, the angle irons M, mounted above said supporting irons L and a series of pans carried by said angle irons M, substantially as and for the purposes set forth.

2. In a drier, the combination with the drying chamber the back wall thereof being provided with vertical projections G, forming parallel flues E, of the angle irons F, secured to said projections G, the vertical supports I, mounted within the drying chamber near the front wall thereof, the supporting irons L, bolted to the supports I and angle irons F, said supporting irons L being horizontally arranged one above the other, the steam pipes O, mounted on said supporting irons L, the angle irons M, bolted to the supports I at their forward ends and provided at their rear ends with forked irons N, which straddle the supporting irons L, and a series of pans carried by said angle irons M, substantially as and for the purposes set forth.

3. In a drier, the combination with the drying chamber provided with a series of vertical flues E, at its rear end a pipe C arranged above the flues E, and having openings therein connected with said flues, means for supplying a current of air to said pipe, and a passage T at the bottom of the drying chamber near the front wall thereof, of a series of horizontally arranged pans within said drying chamber having passages between them, which passages connect with the flues E, and steam pipes O, arranged beneath each series of pans, substantially as and for the purposes set forth.

WILLIAM F. JOBBINS.

Witnesses:
ALICE McIVER,
A. M. BEST.